A. DEMARCE & T. VREELAND.
COMBINED CULTIVATOR AND HARROW.
No. 183,147. Patented Oct. 10, 1876.
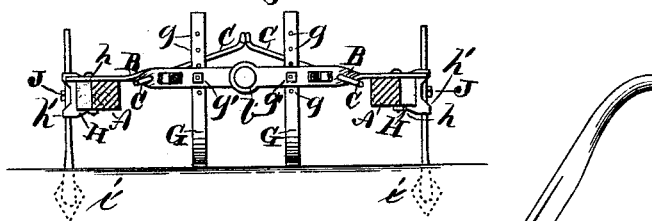
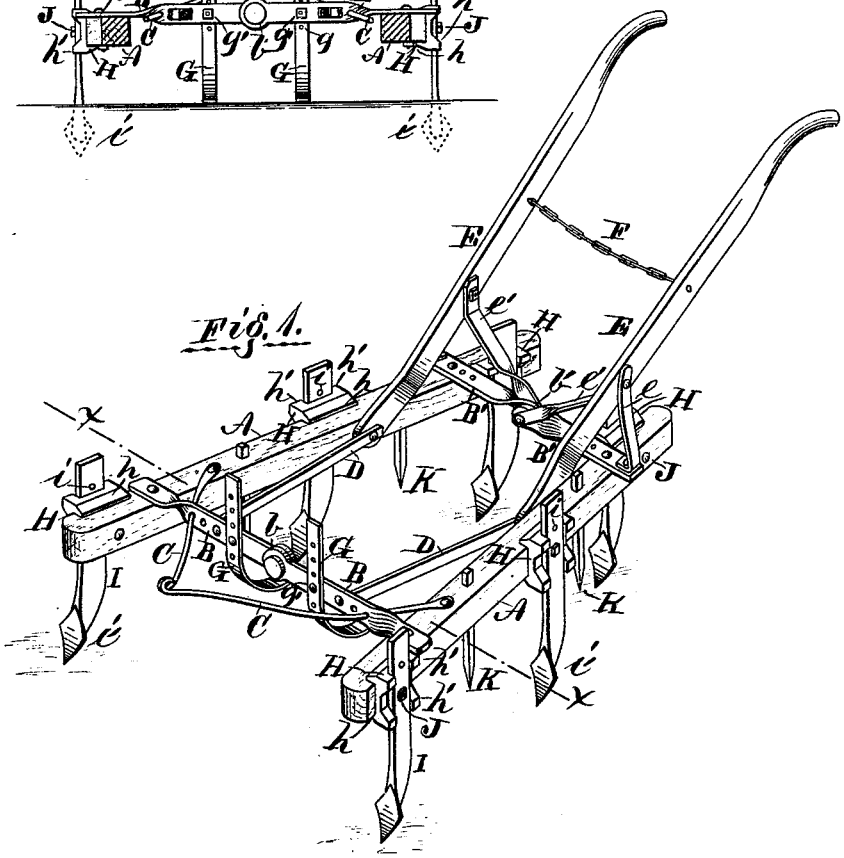
Witnesses:
P. R. Richards.
M. C. Barringer.
Inventors:
Anthony Demarce
and Teunis Vreeland,
By W. B. Richards,
Atty.

UNITED STATES PATENT OFFICE.

ANTHONY DEMARCE AND TEUNIS VREELAND, OF FAIRFIELD, IOWA.

IMPROVEMENT IN COMBINED CULTIVATOR AND HARROW.

Specification forming part of Letters Patent No. 183,147, dated October 10, 1876; application filed September 9, 1876.

*To all whom it may concern:*

Be it known that we, ANTHONY DEMARCE and TEUNIS VREELAND, of Fairfield, in the county of Jefferson and State of Iowa, have invented certain new and useful Improvements in Combined Cultivators and Harrows; and we do hereby declare that the following is a full, clear, and exact description thereof, which will enable others skilled in the art to which it appertains to make and use the same, reference being had to the accompanying drawings, and to the letters of reference marked thereon, which form a part of this specification.

The nature of our invention relates to a combined cultivator and harrow of that class which is adapted to cultivate both sides of a row of growing plants at each passage of the machine; and the invention consists in the construction and combination of parts described and set forth in the claims hereto annexed.

In the accompanying drawing, Figure 1 is a perspective view of a machine embodying our invention. Fig. 2 is a sectional view in the line $x\ x$ in Fig. 1.

Referring to the parts by letters, letters A represent the beams, connected at their forward ends by bars B B, hinged to each other at $b$, and connected at their rear ends by bars B B', hinged to each other at $b'$. The bars B are somewhat longer than the bars B', and thus make the frame wider at its forward than at its rear end.

C C are draft-hooks; D D, braces; E E, handles, supported on braces $e$ from the frame A, and braces $e'$ from the hinge $b'$. F is a chain-connection between the handles E. G G are runners, their lower ends curved backward to form shoes or runners, and their upper ends pierced with a series of holes, $g$, through which a bolt, $g'$, is inserted to attach them, one to each bar B. Letters H represent blocks, having horizontal ledges $h$ projecting from their upper and lower edges on one side, which ledges fit over the beams A, and having vertical ledges $h'$ on their other sides, between which the upper ends of the standards I are seated, and where they are secured by bolts J, which pass through one of the series of holes, in the standards I, plates or blocks H, and beams A. The standards I have ordinary cultivator shovels or teeth $i'$ on their lower ends. K represents ordinary harrow-teeth fixed in the beams A.

The runners G may be adjusted vertically to regulate the depth of penetration of the shovels $i'$ and teeth K, and the standards I may be also adjusted vertically by means of changing the bolt J in the series of holes $i$. Either side of the frame may be turned upward on the joints $b\ b'$ to free it from obstructions, or for other purposes.

The machine is specially applicable to harrowing and pulverizing the soil while the plants are small.

Having thus described our invention, what we claim as new, and desire to secure by Letters Patent, is—

1. The beams A, having teeth, as described, and connected to each other by the hinged bars B B', and arranged to operate with the runners G, substantially as described, and for the purpose specified.

2. The beams A, having teeth, as described, handles E, chain F, draft-hooks C, and connected to each other by the hinged bars B B', and arranged to operate with the runners G, substantially as and for the purpose specified.

In testimony that we claim the foregoing as our own we affix our signatures in presence of two witnesses.

ANTHONY DEMARCE.
TEUNIS VREELAND.

Witnesses:
G. W. SHRINER,
T. M. GABBLE.